June 26, 1951

W. J. YOST 2,558,118

POSITION REPRODUCING SYSTEM

Filed April 19, 1946

INVENTOR
WILLIAM J. YOST
BY
Sidney A. Johnson
ATTORNEY

Patented June 26, 1951

2,558,118

UNITED STATES PATENT OFFICE 2,558,118

POSITION REPRODUCING SYSTEM

William J. Yost, Dallas, Tex., assignor, by mesne assignments, to Socony-Vacuum Oil Company, Incorporated, New York, N. Y., a corporation of New York Application April 19, 1946, Serial No. 663,420

2 Claims. (Cl. 73—305)

My invention relates to an arrangement for reproducing the position of a concealed or inaccessible member movable in response to changes in magnitude of specific gravity, liquid level, or other condition.

In accordance with my invention, there is disposed adjacent and to one side of the path of movement of the concealed member, which for reasons hereinafter appearing is of magnetizable material, a container for a column of liquid in which is submerged an assembly comprising a second magnetizable member and a float whose buoyancy is selected or adjusted to balance the weight of the assembly thus to insure that the magnetic attraction between the two magnetizable members is substantially the only force tending to effect movement of the assembly.

Further in accordance with my invention, error otherwise arising because of frictional engagement between the movable members and their respective containers is minimized by a stationary magnetizable member of such construction and disposition that it opposes that component of the mutual attraction between the movable magnetizable members which is normal to their paths of movement.

My invention further resides in features of construction, combination and arrangement hereinafter described and claimed.

Figure 1:
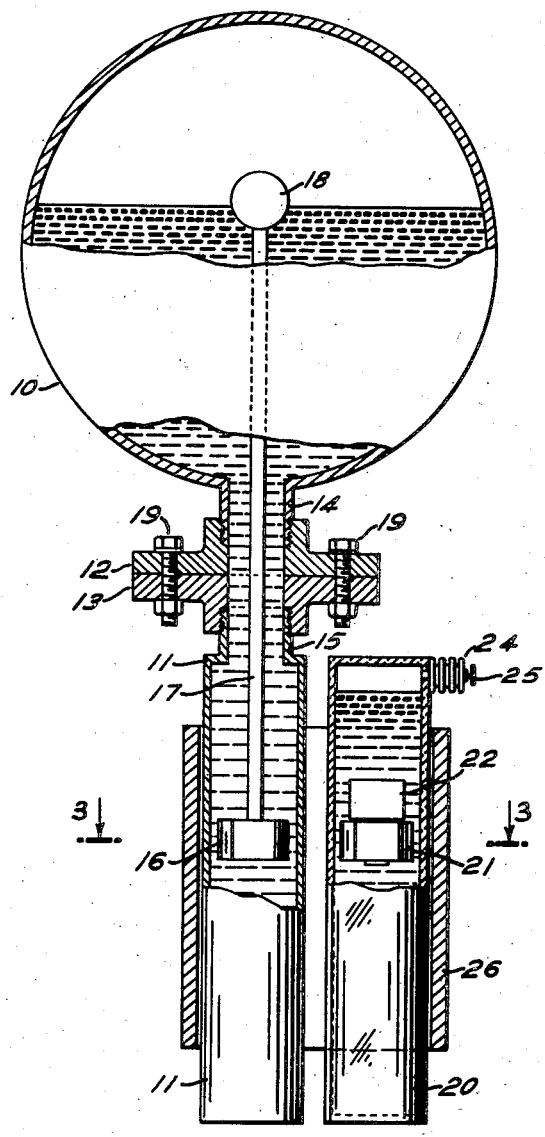
Figure 2:
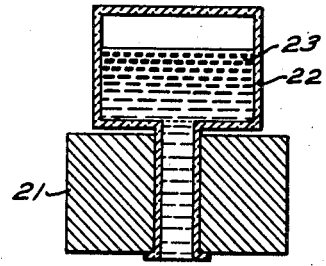
Figure 3:
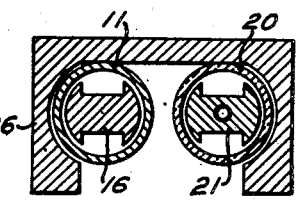

For a more detailed understanding of my invention and for illustration of an embodiment thereof, reference is made to the accompanying drawings, in which:

Fig. 1 is an elevational view, partly in section and with parts broken away, of an indicator system;

Fig. 2 on enlarged scale and in cross-section, shows the indicator assembly of Fig. 1; and Fig. 3 is a sectional view taken on line 3—3 of Fig. 1.

Figure 4:
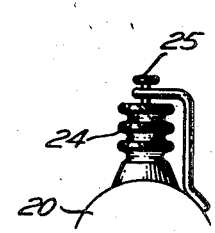

Fig. 4 is a detail view of parts shown in Fig. 1.

Referring to Fig. 1, the tank 10 contains a liquid, the variation of whose specific gravity or level is to be ascertained exteriorly of the tank. It is assumed that because of the nature of the process or character of the liquid, for example, hydrogen fluoride, it is not feasible or desirable to employ either a sight glass or any arrangement in which a mechanical linkage is required to extend through the tank.

In accordance with the present invention, there is connected to the tank at a point below the minimum level of liquid therein a container or tube 11 of length or height which may be approximately equal to the diameter of tank 10. The tube 11 may be of metal such as bronze, stainless steel or other non-magnetic metal resistant to corrosion by the liquid and of strength capable of withstanding the pressures involved. In the particular arrangement shown, communication between the container 11 and tank 10 is effected by way of extensions 14 and 15 to which there are threadedly connected flanges 12 and 13. The latter are held together by bolts 19 or equivalent.

There is disposed within the container 11 for movement axially thereof, a member 16 which, for reasons that hereinafter appear, is of magnetizable material and is itself either a permanent magnet or a magnet by virtue of induction from an adjacent permanent magnet or electromagnet. The magnet 16 is sustained within the liquid column in container 11 by rod 17 to the upper end of which is attached a float 18 which, for purposes of measurement of changes in liquid level, should have sufficient buoyancy to insure that the position of member 16 within container 11 shall correspond with the level of liquid in tank 10. When this float and magnetic member assembly is to be used for measurement of specific gravity, it should have the same characteristics as a hydrometer float, that is, the position of the member 16 within the container 11 should correspond with the specific gravity of the liquid in tank 10.

Thus far described, the changes in position of member 16 convey no information to an observer because of the opacity of container 11. Accurately and visibly to reproduce the position of the member 16, there is utilized a second, adjacent container 20 which may be of glass or other transparent or translucent material, or which at least is in part transparent as by provision of a window extending more or less from top to bottom. Within the container 20 there is disposed a column of liquid, for example water, in which is disposed an assembly comprising a float 22 and a second magnetizable member 21 which may itself be a magnet or may be a magnet by virtue of induction from an adjacent permanent magnet or electromagnet.

The buoyancy of the float 22, Fig. 2, is so selected or adjusted by determination of the height of the liquid 23 that the assembly 21, 22 has inappreciable or no tendency of itself either to rise or fall in the liquid column within container 20. To avoid the effect of change in atmospheric pressure upon the buoyancy of float 22, the container 20 is sealed. The space above the liquid therein is in communication with a collapsible bellows 24 whose volume may be adjusted manually by the adjusting screw 25 so to adjust the buoyancy of float 22 that the assembly 21, 22 is balanced.

Preferably and especially when the liquid in tank 10, or any of the reaction products in tank 10, are such that any of the elements 16, 17 or 18 may be destroyed, the assembly 21, 22 should have sufficient residual weight or buoyance to insure that upon such occurrence the assembly will go and remain beyond scale and so afford positive indication to an observer of the need for investigation.

With the buoyancy and weight of the assembly 21, 22 reasonably well balanced, it will accurately reproduce, and follow changes in, the position of the concealed inaccessible member 16 to which it is magnetically attracted. When the members 16 and 21 are in corresponding positions or in horizontal alignment, the attractive force between them is at a maximum and so resists displacement of the indicating member 21 from proper position. This same force, however, tends to pull the members 16 and 21 against the sides of the respective containers with consequent likelihood of error due to friction between them and the respective container walls whenever either of members 16 and 21 moves.

To minimize and substantially to eliminate errors of measurement due to such frictional forces, there is disposed about the containers 11 and 20, a stationary member 26 of magnetic material whose length or height substantially corresponds with the range of movement of the members 16 and 21. Member 26 may be a permanent magnet or if either or both of the members 16 and 21 are permanent magnets, may be a soft iron yoke. In any event, the magnetic attraction between the legs of the yoke and the respectively adjacent members 16 and 21 tends to pull the latter horizontally away from one another, so opposing or balancing the tendency of the members 16 and 21 to move toward one another and into frictional engagement with the side walls of the respective tubes 11 and 20. In other words, the member 26 substantially neutralizes the horizontal component of the magnetic force between the members 16 and 21 but leaves unimpaired that component of the force which causes the assembly 21, 22 to move vertically or axially of the container 20 in response to an equal and like motion of member 16: the neutralization of the horizontal component of the mutual magnetic attraction between members 16 and 21 also relieves the former of dragging frictional engagement with its tube 11 for unimpaired sensitivity of response to its actuating float 18.

To minimize or effectively cancel the horizontal component of the attractive force between members 16 and 21 without detraction from the axial component, the yoke member 26 is so positioned and shaped that the attractive force between it and the members 16 and 21 is substantially equal and opposite to their attraction for each other in direction normal or perpendicular to the axes of the tubes. To attain this equality or balance of forces, the reluctance of the path of magnetic flux between members 16 and 21 is made substantially equal to the reluctance of the path from 16 to 26 and thence to 21. This equality is obtainable by proper adjustment or design of the gaps between the magnetic members 16, 21 and 26, of the configuration of the pole pieces of member 26, or of the thickness and shape of the central section of member 26 which connects the pole pieces thereof.

As above stated, any one or more of members 16, 21 and 26 may be a permanent magnet, preferably of "Alnico"; alternatively, one or both of members 16 and 21 may be soft-iron and the member 26 the soft-iron yoke of an electromagnet. In event of de-energization of the electromagnet, as by failure of its power supply, the small residual buoyancy or weight of the assembly 21, 22 will cause it to go beyond scale and so indicate the inoperative condition of the arrangement and need for investigation.

Although I have specifically described a preferred form of my invention and a particular use thereof, it shall be understood that changes, modifications and other uses may be made, all, however, within the scope of the appended claims.

What I claim is:

1. Means for indicating the position of a concealed magnetic member comprising a closed container for supporting a column of liquid adjacent the path of movement of said magnetic member and which at least in part is transparent lengthwise of the column, an assembly submerged in said column, visible through said container and comprising a second magnetic member attracted to said first magnetic member and a float connected to said second magnetic member to form a unit and having passage means permitting entry therein of liquid from said column, the buoyancy of said float and the weight of said second magnetic member being at least in approximate balance, and means for varying the pressure of gas within said container above said liquid column to effect proportional movement of liquid from or into said float through said passage means.

2. A position-reproducing system comprising a magnetic member movable in response to changes in magnitude of a condition, a sealed container for supporting a column of liquid adjacent the path of movement of said member, a submerged assembly movable in said column comprising a float and a second magnetic member attracted by said first magnetic member, said float having passage means permitting entry of liquid from said column and means connected to said container for varying the pressure on said column to adjust the buoyancy of said float for balance against the weight of said second magnetic member.

WILLIAM J. YOST.

REFERENCES CITED

The following references are of record in the file of this patent:

UNITED STATES PATENTS

| Number | Name | Date |
|---|---|---|
| 995,414 | Nault | June 13, 1911 |
| 1,363,139 | Mason | Dec. 21, 1920 |
| 2,339,922 | Gatewood | Jan. 25, 1944 |

FOREIGN PATENTS

| Number | Country | Date |
|---|---|---|
| 535,746 | Germany | Oct. 15, 1931 |
| 358,462 | Germany | Sept. 9, 1922 |
| 20,418 | England | Nov. 11, 1892 |